United States Patent [19]
Stahl et al.

[11] 3,928,648
[45] Dec. 23, 1975

[54] METHOD AND COMPOSITION FOR LOW PH WHIPPED TOPPINGS

[75] Inventors: Howard D. Stahl, Hartsdale; Rex J. Sims, Pleasantville, both of N.Y.

[73] Assignee: General Foods Corporation, White Plains, N.Y.

[22] Filed: June 12, 1974

[21] Appl. No.: 478,656

[52] U.S. Cl. ............................................. 426/564
[51] Int. Cl.² ........................................... A23L 1/00
[58] Field of Search ............ 426/98, 163, 363, 201, 426/564

[56] References Cited
UNITED STATES PATENTS

| | | | |
|---|---|---|---|
| 2,786,765 | 3/1957 | Prince | 426/163 |
| 3,098,748 | 7/1963 | Noznick et al. | 426/98 B |
| 3,353,965 | 11/1967 | Patterson | 426/163 |
| 3,434,848 | 3/1969 | Katz | 426/363 |
| 3,514,298 | 5/1970 | Noznick et al. | 426/363 A |
| 3,597,233 | 8/1971 | Patterson | 426/163 |

*Primary Examiner*—Jeanette M. Hunter
*Attorney, Agent, or Firm*—Thaddius J. Carvis; Daniel J. Donovan

[57] ABSTRACT

A dry whipped topping mix, containing a minor amount of strogly hydrophilic, anionic emulsifier and a major amount of a nonionic emulsifier. The emulsions prepared in this manner are stable enough to endure the rigors of drying at elevated temperatures, without the need for added protein or gums as stabilizers, and to be stored in liquid or dried form for extended periods of time with superior temperature tolerance. A small amount of a destabilizing agent is added to the emulsion to provide superior whipping characteristics through a wide range of whipped textures.

31 Claims, No Drawings

3,928,648

METHOD AND COMPOSITION FOR LOW PH WHIPPED TOPPINGS

BACKGROUND OF THE INVENTION

The present invention relates in general to whipped toppings, and more particularly to a dry, protein-free whipped topping mix, a protein-free whipped topping, and methods for preparing these products.

This application is related to subject matters similar to those disclosed in co-pending U.S. applications Ser. No. 434,531 filed Jan. 18, 1974, and Ser. No. 479,325 filed concurrently herewith, both applications filed by the inventors of the subject case.

It has long been recognized that fresh dairy cream can be whipped to provide delicious whipped toppings for desserts and other foods. However, because cream is relatively perishable and must be stored under refrigeration, the art has endeavored to provide suitable substitutes.

There are presently known a wide variety of whipped cream substitutes usually prepared from oil-in-water emulsions. Some of these are available as dried powders for convenience of storage and handling, but most all contain protein or suffer severe penalties in functionality either during the drying or the whipping of the emulsion.

Experience has shown that it is extremely difficult to obtain an emulsion which, if stable enough to be dried, will then be capable of whipping to provide a topping having the consistency and mouthfeel of real whipped cream. Typically, successful products of this type must contain protein and/or hydrocolloids to provide stability for drying. Because of the increasing cost of protein sources, and their relative instability, it would be advantageous to have a product which does not require protein.

In an article in Food Technology, W. H. Knightly (Vol. 22, 731–744, pages 73–86, June, 1968) discusses the preparation of non-dairy whipped toppings. Generally, these toppings are based upon emulsified vegetable fats and contain corn syrup, sugar, water, stabilizers, and flavor and coloring materials. Most of the toppings discussed by Knightly contain protein in the form of sodium caseinate as an emulsifier and film former. Under certain conditions, Knightly suggests removing the protein and increasing the amount of the non-proteinaceous emulsifier used or using a more hydrophilic emulsifier. He also suggests increasing the relative amounts of sugar and stabilizers to provide added body to the toppings. However, while these suggestions may help mitigate localized curdling or syneresis, they may lead to a topping of gummy texture and may seriously effect the whipping characteristics of the topping.

In U.S. Pat. No. 3,514,298 to Noznick et al., there is a further discussion of the preparation of protein-free toppings. Noznick et al. disclose the preparation of aqueous emulsions of a carbohydrate and fat by employing a partial ester of a higher fatty acid and a polyglycerol. Noznick et al. state that their protein-free emulsions can be sprayed dried; however, once dried, they can be whipped only under carefully controlled conditions to provide whips of desirable texture and mouthfeel.

Further exemplary of whipped toppings employing nonproteinaceous emulsifier systems is that disclosed by Prince in U.S. Pat. No. 2,786,765. Prince discloses a concentrate which can be combined with water and whipped to form a topping. The concentrate comprises sugar, water, fat and an emulsifier system comprising about one part by weight of sorbitan monostearate per fifteen parts by weight of fat and an extremely small amount of sodium stearate (i.e., about 0.06 percent). Tests reveal, however, that the concentrate disclosed by Prince cannot be dried at elevated temperatures.

Thus, there is a present need for an emulsion system capable of being efficiently dried to provide an easily handlable powder which can then be readily rehydrated and whipped to provide high quality whipped toppings.

Moreover, experience has shown that production anomalies often render a whole batch or production run of protenaceous or protein-free product unsuitable for whipping according to the established recipe. This creates exaggerated costs due to recycling, if possible, or discarding if recycling is not possible. It would therefore be advantageous to have a product which could be readily conformed to a desired functionality, notwithstanding anomalous variations in processing.

SUMMARY OF THE INVENTION

Accordingly, it is an object of the present invention to provide a dry, protein-free whipped topping mix and a method for preparing the same which assure the production of high quality whipped toppings.

This and other objects are accomplished according to the present invention which provides a protein-free, dry whipped topping mix, a whipped topping, and methods for preparing these products. Central to the present invention is the use of a novel emulsifier system which, when employed in a carbohydratefat emulsion system, allows the production of a highly stable emulsion which can be dried for storage and transportation, and when rehydrated, can be destabilized to provide, a whipped topping which is similar in characteristics to natural whipped cream.

DETAILED DESCRIPTION OF THE INVENTION

The compositions of the present invention do not require proteinaceous materials of any kind as emulsifiers or stabilizers; however, their use as flavorings or nutritional fortifiers is not contrary to the spirit of the present invention.

The present invention employs oil-in-water emulsions containing a carbohydrate dissolved in a continuous water phase. These emulsions are dried, such as by spray or drum drying, to provide a dry powder comprising fat encapsulated in a matrix of the carbohydrate. This dry powder can then be admixed with a destabilizing agent and rehydrated to provide a whipped topping of superior texture and mouthfeel. The destabilizing agent can be added as a dry powder or as a liquid.

The nature of the fat is not critical to the present invention but can be selected from any number of fats or oils available. It is noted, however, that a fat having a high solids content (e.g., greater than 40 percent) at the proposed whipping temperature and a rapid melt down to a low solids content at body temperature is important for acceptable mouthfeel. The usual topping fats of coconut origin are acceptable. For example, coconut oil which has been hydrogenated to have a melting point of about 90°F – 94°F is suitable.

Further exemplary of other fats which can be employed according to the present invention are those of vegetable origin, such as hydrogenated cottonseed oil, hydrogenated corn oil, hydrogenated or hydrogenated and fractionated soybean oil, hydrogenated olive oil, etc. This list is by no means exhaustive, but merely exemplary of materials which may be readily employed by those skilled in the art. The particular fat is limited only to the use of edible fats which provide the desired working characteristics and mouthfeel.

A wide variety of carbohydrates can be employed in the present invention. The principal criteria for selection of the carbohydrate are that it be compatible with the emulsifier system of the present invention and that it produce stable emulsions which can be efficiently dried. Within these guidelines, the sweetness of the final whipped topping may be varied over a wide range depending upon the selection of a particular carbohydrate. Exemplary of the carbohydrates which can be employed are corn syrups with DE values which would allow emulsion stability and drying at elevated temperatures. For example, those having DE values of 24 to 60, and low contents of higher polymeric materials are suitable. The higher polymeric materials produce unstable emulsions - apparently due to the complexing of these materials with the ionic emulsifier. In addition, the corn syrup should be low enough in dextrose content so that it will dry readily in a spray or drum dryer and produce a product that is essentially non-hygroscopic. A particularly suitable corn syrup used according to the present invention is one having a DE value of 43 which contains about 5 percent dextrose, 48 percent maltose, 14.5 percent trisaccharides and 32.5 percent tetra and higher saccarides which is available from Corn Products Co. as Mor-Sweet 1435. Other suitable carbohydrates which can be employed according to the present invention are those as described in the above noted U.S. Pat. No. 3,514,298 to Noznick, et al.

In general, to prepare a dry powder from an emulsion of the type discussed above, it is necessary to employ at least one strongly hydrophilic emulsifier. Without it the stability necessary for drying the emulsion, such as by spray or drum drying, would be difficult to obtain.

Of the many theories on emulsion stability, the one on electrical or charge stabilization appears the easiest to understand. Charges surrounding oil droplets can arise via: ionization, adsorption or frictional contact. In our case the emulsion is stabilized at least in part by an ionic emulsifier. The carboxylic end of the emulsifier projects into water phase and is ionized to some degree. The (COO⁻) grouping thus forms an effective coating of negative charges around the oil droplet. When one of these highly charged droplets approaches another, repulsive forces arise which prevent its close approach and coalescence. This is one prime reason why ionic emulsifiers produce shelf stable liquid emulsions. A further consequence is the exceptional heat stability of these emulsions which show little or no oil separation upon prolonged boiling. The thermal energy added by heating is still not sufficient to cause significant coalescence. This is a principal reason why these emulsions can be spray dried without the presence of other stabilizers such as protein or gums.

However, the fact that we can prepare highly stable oil-in-water emulsions alone does not advance the technology of whipped toppings. These highly stable emulsions may be useful as clouds, coffee lighteners and milks but do not whip well. It has been noticed in practice that where stability sufficient for drying is obtained without protein or gum stabilizers, the whipping characteristics of the emulsion are deficient.

A principal feature of the present invention is the discovery that while a strongly hydrophilic emulsifier is necessary for proper drying, controlled destabilization of the emulsion is necessary to obtain the desired whipped-cream-like characteristics in the final topping. It has been found according to the present invention that this can be achieved by employing an emulsifier system comprising a minor amount of a first, strongly hydrophilic, anionic emulsifier and a major amount of a second, nonionic emulsifier.

The first emulsifier, which initially provides stability for drying, is acted upon, after rehydration with the addition of a controlled amount of a destabilizing agent to partially destabilize the emulsion and thereby allow agglomerated fat to surround the air bubbles and provide structural strength to the topping. Without these fat agglomerates, the air cells would tend to coalesce and subsequently collapse. The first emulsifier is employed in an amount of from about 0.5 to about 5 percent based on the dry weight of the ingredients.

The degree of destabilization is, however, controlled by the second emulsifier. Because of the presence of the second emulsifier, destabilization is allowed to occur only to the extent necessary to obtain sufficient agglomerates to provide the desired structural strength to the whipped topping, while preventing complete destabilization of the emulsion with its attendant undesirable effects on the texture and mouthfeel. The second emulsifer is employed in an amount of from about 1.5 to 10 percent based on the dry weight of the ingredients.

The first emulsifier is necessarily anionic. Preferably, the emulsifier is one which is strongly hydrophilic when ionized, but less hydrophilic and more hydropobic under conditions reducing the degree of ionization. These properties enable the preparation and drying of stable aqueous emulsions, and further enable rapid redispersion of the dried emulsion in cold aqueous liquid with controlled destabilization upon addition of a destabilizing agent.

A wide variety of anionic emulsifiers can be employed as the first emulsifier according to the present invention. Particularly preferred among these are the class of emulsifiers defined as the soluble sodium or potassium salts of fatty acid esters of a polyol esterified with a di- or tri-carboxylic food acid. The polyol can be glycerol, propylene glycol, a polyglycerol, or 1, 3-butylene glycol. Typical of this class of emulsifiers is Myverol SMG succinoylated monoglycerides available from Eastman Chemical Co. Further exemplary of this class of emulsifiers are diacetyl tartaric acid esters of mono- and diglycerides, citric acid esters of mono and diglycerides and steroyl propylene glycol hydrogen succinate. Another suitable class of emulsifiers includes the sodium and potassium salts of fatty alcohol esters of di- or tri-carboxylic food acids. Typical of these emulsifiers is sodium stearyl fumarate. A further group of suitable emulsifiers which may be used as the first emulsifier according to the present invention are the sodium and potassium salts of fatty acid esters of hydroxy carboxylic food acids. Representative of these emulsifiers is sodium stearoyl-2-lactylate. Additionally, the inorganic polyfunctional acid esters of mono and di-glycerides, such as phosphated mono and di-glycerides, can be employed as the first emulsifier according to the present invention.

The second emulsifier employed in the emulsifier system of the present invention is a hydrophilic emulsifier which is unaffected by the destabilizing agent. Accordingly, when the addition of the destabilizing agent to the emulsion reduces the hydrophile-lipophile balance of the first emulsifier, the presence of the second emulsifier controls the destabilization to occur to no greater than the desired degree. Particularly desirable for use as the second emulsifier are nonionic emulsifiers such as polysorbate 60, available as Drewpone 60 from Drew Chemical Co. Other nonionic emulsifiers which may be employed according to the present invention are decaglycerol monostearate, decaglycerol distearate, and propylene glycol monostearate. The selection of any particular one of this group of emulsifiers is largely a matter of choice, it being necessary only that it can be employed in amounts sufficient to adequately control the rate of destabilization of the emulsion and that it not interact adversely with the other components of the system.

While the precise operable limits of the amount of the first and second emulsifiers relative to each other and to the total composition will vary depending upon the relative effectiveness of the emulsifiers, their respective molecular weights, and the amount of destabilizing agent employed in the whipping composition, it can be said with a reasonable degree of precision that the emulsifier system should be present in an amount ranging from about 2 to about 15 percent and preferably from about 4 to about 13 percent, based on the total weight of the dry ingredients. Generally, the first emulsifier and the second emulsifier are present at a weight ratio of from about 1:15 to about 1:1, preferably from about 1:12 to about 1:2. Knowing the teachings of the present invention, optimizing the amounts of the emulsifiers relative to each other and to the total composition will be readily determined by those skilled in the art.

Among the destabilizing agents which can be employed according to the present invention are acids, higher polymeric carbohydrates which complex with the anionic emulsifiers, and and sources of polyvalent cations which form insoluble, edible salts with the anionic emulsifiers.

Among the suitable acids are any of those which are non toxic when employed at levels sufficient to provide the required degree of destabilization. Depending upon the time of addition, e.g. whether before packaging or at the time of use by the consumer, the acid can be either dry or in aqueous solution. Typical of the dry acids are the food grade acids such as malic, fumeric, citric, adipic, and the like. Other dry acid forms, such as dry fruit juice or beverage mixes, can also be employed. Representative of these are Tang orange-, grape- and grapefruit-flavored instant breakfast drink mixes. All of these above mentioned acids can also be employed when present in aqueous solution. Other aqueous acid solutions, such as fresh fruit juices, vinegar and the like, can also be employed. The acid should be present in an amount effective to at least partially destabilize the emulsion. Preferably, the acid will be employed at a molar ratio, of acid to anionic emulsifier, within the range of from about 10:1 to about 1:20, more preferably from about 1:2 to about 1:1.

Many higher polymeric carbohydrates complex with the anionic emulsifiers and decrease the effectiveness of the emulsifiers to provide stable emulsions. These high molecular weight materials are believed to complex with the anionic emulsifiers in such a way that the emulsifiers are removed from the surface of the oil droplets. Representative of materials of this class are the higher polymers of dextrose (e.g., those having molecular weights above about 2500), pregelatinized starch and high molecular weight polymers of glucose such as amylose. The high molecular weight polymers of dextrose are found in low DE, e.g. 24, hydrolyzed corn syrup. As with the acid, these destabilizing agents can be employed in dry form by blending with the dried emulsion, or in aqueous solution to the rehydrated emulsion.

For use as a destabilizing agent according to the present invention, the suitable polyvalent cations are those which form insoluble, edible salts with the anionic emulsifier in aqueous solution. A number of cations having this capability are available. Representative of these are $Ca^{++}$, $Mg^{++}$ and $Al^{+++}$. Suitable sources of these ions are the normally soluble salts such as the chlorides, sulfates and phosphates of calcium, magnesium and aluminum. There are also a wide variety of additional sources, such as food products containing the cations. In the case of calcium, milk, either fresh or dry, is a suitable source.

Other ingredients may also be included in the composition of the present invention such as flavorants, colorants or dyes, vitamins, minerals and the like.

In general, the process of the present invention includes blending the fat, carbohydrate, water and emulsifier system, establishing a stable oil-in-water emulsion, with the fat as the discontinuous phase and an aqueous solution containing the carbohydrate as the continuous phase; drying the emulsion to thereby encapsulate the fat within a matrix of the carbohydrate and form a dry, free-flowing powder suitable for convenient storage and/or shipment. To whip the emulsion it is necessary to add an amount of destabilizing agent effective to partially destabilize the emulsion upon rehydration; redisperse the carbohydrate-encapsulated fat in water; and whip to obtain the final topping.

In preparing the emulsion, it is generally preferred that the first and second emulsifiers be first dispersed in the requisite amount of water for forming the emulsion. The water is generally present in an amount of from abut 25 to about 90 percent based on the total weight of the emulsion. Where the first emulsifier is available in the acid form such as Myverol SMG succinylated monoglycerides, it is necessary to form the sodium or potassium salt thereof by the addition of a suitable neutralizing medium. A desirable procedure for accomplishing this is to add the emulsifier with a slight excess of sodium carbonate to neutralize it.

While the order of addition of the two emulsifiers is not critical, it is preferred that the first emulsifier be added first, and neutralized if necessary, before the addition of the second emulsifier. The water containing the emulsifiers is then mixed with from about 10 to about 70 percent, based on the weight of the emulsion, of the carbohydrate under suitable mild heating, typically at about 40°C to about 60°C. This mixture is then vigorously mixed for a period of from about 1 to 2 minutes. The fat, generally from about 10 to about 70 percent based on the weight of the emulsion, is heated to the temperature of the emulsifier-containing, water-carbohydrate solution and admixed therewith. In the emulsion, and in the dry topping mix the carbohydrate and fat will be present at a weight ratio of from about 1:7 to about 7:1; preferably from about 1:2 to about 2:1.

The admixture is then vigorously agitated for from about 5 to 10 minutes to obtain a stable emulsion. Agitation may be accomplished by any suitable means such as a blender of the ordinary home type, or any other suitable high shear device capable of emulsification. A preferred method for emulsifying includes passing the blended ingredients through a homogenizer of the typical dairy type. Homogenization can be accomplished in one stage or two. The homogenization pressure for the first stage should be within the range of from about 1500 to 8000 psi. If a second stage is employed, the pressure in that stage should be within the range of from about 500 to about 1500 psi. For spray drying, second stage homogenization can be omitted.

After emulsification, the emulsion is dried as by spray or drum drying. For efficient spray drying, the emulsion should generally contain from about 25 to about 50 percent of water based on the total weight of the emulsion. The emulsion is heated to a temperature within the range of from about 50°C to about 80°C, and preferably of about 60°C. The emulsion is sprayed counter current to a stream of drying air to yield a fine powder comprising fat encapsulated in the carbohydrate. For drum drying, the emulsion should desirably contain from about 25 to about 40 percent by weight of water. The emulsion is heated and fed to a drum dryer to obtain fine flakes comprising fat encapsulated in the carbohydrate.

The carbohydrate encapsulated fat can be marketed in this form for admixture by the consumer with destabilizing agent, or it can be admixed with a dry destabilizing agent. In the dried form, the carbohydrate encapsulated fat can be easily stored, transported and handled to facilitate packaging and sale for commercial and home use. This dry topping mix has an extremely good shelf life and needs no special precaution for storage except for avoiding excessively high humidity or temperature conditions. It has greater heat stability than mixes containing protein, being better able to withstand both low and high temperatures; having a tolerance of at least from about 32° to about 140°F.

When it is desired to market the protein free topping mix as the dried, carbohydrate-encapsulated fat, without the addition of the dry destabilizing agent, the recipe would call for simply dispersing the powder in an aqueous medium containing the destabilizing agent. When it is desired to employ the dried topping mix with a dry destabilizing agent incorporated therein, the destabilizing agent is simply dry blended with the carbohydrate-encapsulated fat.

In preparing the whipped topping from the dry mix, from about 50 to about 90 percent, preferably from about 65 to about 85 percent, by weight of water or aqueous solution is mixed with the dry mix before aerating. The whipped toppings produced according to the present invention can be aerated in known manner, such as whipping with a conventional home mixer for from about 1 to 5 minutes. Typically, the topping is whipped to an overrun of from about 100 to about 250 percent, and exhibits good freeze-thaw stability. Desirably, these toppings exhibit Brookfield viscosities within the range of from about 15 to 70 units, and preferably about 25 to about 55 units as measured on a Brookfield Synchroelectric Viscometer using a 36 mm T-bar spindle rotated on a helipath at 20 rpm. However, it is now possible according to the present invention to form more viscous, less airy foams having a consistency similar to cake icing or less viscous, more airy foams simply by adjusting the degree of foam destabilization by selecting the desired amounts of destabilizing agents and anionic emulsifiers.

The following examples are presented for the purpose of further illustrating and explaining the present invention and are not to be taken as limiting in any sense. Unless otherwise stated, all parts and percentages are by weight.

EXAMPLE I

An exemplary, dry, protein-free topping mix according to the present invention is prepared having the following formulation on a dry basis:

47 percent Wecobee HLWB fractionated hardened coconut oil available from Drew Chemical Co.;
3 percent Myverol SMG emulsifier, which is succinylated monoglycerides and is available from Eastmen Chemical Co.;
0.3 percent sodium carbonate
10.0 percent propylene glycol monostearate (PGMS)
39.7 percent Mor-Sweet 1435, high maltose corn syrup solids (43 D.E.)

The Myverol SMG emulsifier (15g) and sodium carbonate (1.5g) were added to 250 ml of water and heated at 60°C with stirring until all of the Myverol SMG emulsifier was neutralized and dispersed. The PGMS emulsifier (50g) was then added to the Wecobee HLWB coconut oil (235g) and this mixture was then heated and melted. Mor-Sweet 1435 corn syrup (82 percent solids, 242.1g) which had previously been heated to about 60°C was admixed with the aqueous emulsifier blend. The resulting thin syrup was then added to a one quart Waring Blendor jar and mixed at high speed for about one minute. The melted fat was added to the Waring Blendor jar and mixed with the thin syrup for about 5 minutes to form a stable emulsion. The emulsion was spray dried in a Niro Portable spray drier (Nichols Engineering Research Corp.) having an inlet temperature of 175°C and an outlet temperature of about 50°C. The emulsion dried readily to give a dry topping mix as a fine white powder. This sample and a commercial dry topping mix containing protein were heated to 140°F for 2 hours and allowed to stand at room temperature for 3 days. Whipping tests were then made comparing the commercial product to the above sample. The commercial mix was mixed with ½ cup milk according to directions, and the 45 grams of the sample was mixed with 12 grams sugar and ½ cup milk. Both were whipped for three minutes. The results are summarized in Table I.

TABLE I

|  | Unheated | | Heated | |
| --- | --- | --- | --- | --- |
|  | % Overrun | Viscosity | % Overrun | Viscosity |
| Commercial Mix | 237 | 27 | 155 | 6 |
| Sample of Example I | 338 | 48 | 349 | 49 |

EXAMPLE II

To illustrate further how this invention works we have applied it to a simple emulsion system of the following composition:

| | |
|---|---|
| Hydrogenated Coconut Oil (Wecotop A) | 24% |
| Propylene Glycol Monostearate (PGMS) | 5% |
| Sucrose | 38% |
| Dextrose | 7% |
| Succinoylated Monoglycerides (SMG) | 1% |
| H$_2$O (plus NaOH) | 25% |

The Coconut Oil and PGMS are melted together. The SMG is dispersed in H$_2$O at 65°C and titrated with 0.1 N NaOH to the desired pH using a pH meter. Then the sugars are dissolved. The fat phase is added to the water phase with high speed mixing in a Waring Blendor. The emulsions obtained are summarized in Table II.

TABLE II

| Sample | % H$_2$O | % 0.1N NaOH | pH | Appearance |
|---|---|---|---|---|
| A | 6 | 19 | 7.1 | Clear Fluid |
| B | 11 | 14 | 6.6 | Sl Turbid, Fluid |
| C | 15 | 10 | 6.0 | Opaque, Fluid |
| D | 20 | 5 | 5.5 | Gelatinous |
| E | 22 | 3 | 4.9 | Soft Paste |
| F | 24 | 1 | 4.8 | Firm Paste |
| G | 25 | 0 | 3.8 | Separates into layers |

Whipping Tests

To 100 g of each of emulsions A - F at room temperature in a Kitchen Aid Mixer was added 100 mls of ice water. The mixtures were whipped for 3 minutes at high speed. The results are summarized in Table III.

TABLE III

| Sample | % Overrun | Brookfield Viscosity |
|---|---|---|
| A | 14 | 0 |
| B | 97 | 1 |
| C | 205 | 53 |
| D | 240 | 63 |
| E | 329 | 37 |
| F | 137 | 7 |

The above data illustrate the wide spectrum of textures which is available in a whip by making a simple adjustment in pH before whipping. These samples, prepared in the intermediate moisture range, have excellent resistance to mold or bacterial spoilage so that they can be stored for prolonged periods at room temperature. At a pH of 6.0 or above the samples also show resistance to phase separation. Sample A may be stored for periods in excess of 1 year without any noticeable changes in viscosity or can be spray dried as in Example I. Yet at the time it is to be whipped, a small quantity of a destabilizing agent, such as citric acid, may be added for destabilization so that a satisfactory whip is obtained. Succinoylated monoglycerides (SMG) is only one example of an anionic surfactant which can be used.

EXAMPLE III

Another exemplary topping mix is prepared according to the present invention having the following formulation on a dry basis:

| | |
|---|---|
| 47% | Wecobee HLWB coconut oil |
| 10.0% | propylene glycol monostearate (70% monoester content) |
| 3.0% | Myverol SMG emulsifier |
| 0.3% | sodium carbonate |
| 39.7% | Mor-Sweet 1435 corn syrup |

Fifteen grams SMG emulsifier and 1.5 g sodium carbonate were added to 250 mls water and heated on a steam bath until the SMG emulsifier is dispersed (neutralized). Wecobee HLWB coconut oil (235 g) and PGMS emulsifier (50 g) were heated together until melted. The aqueous SMG dispersion was then mixed with 242.1 g Mor-Sweet 1435 corn syrup (82 percent solids) and added to a quart size Waring Blendor jar. The melted Wecobee/PGMS component was added to the Waring Blendor jar and blended for five minutes to emulsify. The emulsion was spray dried in a Niro spray drier at 175°C inlet temperature. The emulsion dried nicely to a free flowing powder. The dried emulsion was tempered by cooling to 43°F for 16 hours, heating to 90°F for 3 hours and allowing the emulsion to return to room temperature.

| Whip Evaluation | |
|---|---|
| A. | 45 g topping mix powder of Example III<br>12 g Sugar<br>120 ml Milk (43°F) |

The above mixture was whipped for 1½ minutes at high speed in a Sunbeam Mixmaster. The resulting whip had an overrun of 296 percent and Brookfield Viscosity of 65 (36 mm T Bar at 20 rpm). The whip had a texture much like that of commercial Dream Whip whipped topping.

| | |
|---|---|
| B. | 35 g. topping mix powder of Example III<br>12 g Sugar<br>120 ml Milk (43°F) |

The above mixture was whipped for 2 minutes at high speed in a Sunbeam Mixmaster. The resulting whip had an overrun of 360 percent and Brookfield Viscosity of 50. The whip had a smooth texture remarkably similar to commercial Dream Whip whipped topping.

EXAMPLE IV

Another exemplary topping mix is prepared according to the present invention having the following formulation on a dry basis:

| | |
|---|---|
| 47% | Wecobee HLWB coconut oil |
| 7.5% | Propylene glycol monostearate (70% monoester content) |
| 1.41% | Myverol SMG emulsifier |
| 0.141% | sodium carbonate |
| 0.5% | Drewpone 60 polyoxyethylene sorbitan monostearate |
| 43.45% | Mor-Sweet 1435 corn syrup solids |

Myverol SMG emulsifier (7.05 g), anhydrous sodium carbonate (0.70 g) and Drewpone 60 (2.5 g) are added to 200 ml water and heated on a steam bath to neutralize Myverol SMG. The propylene glycol monostearate (50 g) and Wecobee HLWB (235 g) are melted together. The aqueous dispersion of emulsifiers is added to the Mor-Sweet 1435 corn syrup (264.9 g) to give a thin syrup which is transferred to a Waring Blendor jar and mixed at high speed for one minute. The fat is added to the Waring Blendor jar and mixed for 5 minutes at highest speed. The resulting emulsion is dried in a Niro spray drier at 175°C inlet temperature. The dried product is tempered by placing in the refrigerator overnight and allowed to return to room temperature.

Whip Evaluation

The following dry components are blended:

| | |
|---|---|
| 45 g | dry topping mix |
| 12 g | sugar |
| 0.18 g | CaCl$_2$ |

This blend is then placed in a Sunbeam Mixmaster bowl. Add milk (120 ml) and vanilla (2 tsp.) and whip at high speed for 3 minutes to give a smooth whip of 280 percent overrun and Brookfield viscosity of 25.

Many modifications and variations of the present invention will become apparent to those skilled in the art upon reading the above disclosure. It is intended that all such modifications and variations be included within the scope of the invention which is defined only by the following claims.

What is claimed is:

1. An improved method for preparing a dry whipped topping mix from a stable emulsion which comprises:
    forming an emulsion comprising fat, water, carbohydrate and an amount of an emulsifier system which is effective to provide a stable emulsion, the emulsifier system comprising a minor amount of a strongly-hydrophilic, anionic emulsifier and a major amount of a nonionic emulsifier, the strongly-hydrophilic anionic emulsifier and the nonionic emulsifier being present at a weight ratio of within the range of from about 1:15 to about 1:1;
    drying the emulsion; and thereafter
    adding an amount of a destabilizing agent to the emulsion effective to partially destabilize the emulsion upon rehydration.

2. An improved method according to claim 1 wherein the emulsifier system is present in an amount of from about 2 to about 15 percent based on the weight of the dry ingredients.

3. An improved method according to claim 2 wherein the strongly-hydrophilic, anionic emulsifier and the nonionic emulsifier are present at a weight ratio of within the range of from about 1:12 to about 1:2.

4. An improved method according to claim 3 wherein the emulsifier system is present in an amount of from about 4 to about 13 percent based upon the weight of the dry ingredients.

5. An improved method according to claim 4 wherein the fat is present in an amount of from about 10 to about 70 percent and the carbohydrate is present in an amount of from about 10 to about 70 percent, both based upon the weight of the emulsion.

6. An improved method according to claim 1 wherein the destabilizing agent is an acid.

7. An improved method according to claim 1 wherein the destabilizing agent is a higher polymeric carbohydrate which complexes in aqueous solution with the anionic emulsifier.

8. An improved method according to claim 1 wherein the destabilizing agent is a source of polyvalent cations which form insoluble, edible salts with the anionic emulsifier.

9. An improved method according to claim 8 wherein the destabilizing agent is milk.

10. An improved method according to claim 1 wherein the emulsion is spray dried.

11. An improved method according to claim 1 wherein the emulsion is drum dried.

12. An improved method for preparing a whipped topping which comprises:
    forming a stable emulsion comprising fat, water, carbohydrate and an amount of an emulsifier system which is effective to provide a stable emulsion, the emulsifier system comprising a minor amount of a strongly-hydrophilic, anionic emulsifier and a major amount of a nonionic emulsifier, the strongly-hydrophilic anionic emulsifier and the nonionic emulsifier being present at a weight ratio of within the range of from about 1:15 to about 1:1;
    drying the emulsion;
    thereafter adding an amount of a destabilizing agent to the emulsion effective to partially destabilize the emulsion upon rehydration;
    rehydrating the emulsion; and
    whipping the emulsion.

13. An improved method according to claim 12 wherein the emulsifier system is present in an amount of from about 2 to about 15 percent based upon the weight of the dry ingredients.

14. An improved method according to claim 13 wherein the strongly-hydrophilic, anionic emulsifier and the nonionic emulsifier are present at a weight ratio of within the range of from about 1:12 to about 1:2.

15. An improved method according to claim 14 wherein the emulsifier system is present in an amount of from about 4 percent to about 13 percent based upon the weight of the dry ingredients.

16. An improved method according to claim 15 wherein the fat is present in an amount of from about 10 to about 70 percent, and the carbohydrate is present in an amount of from about 10 to about 70 percent, both based upon the weight of the emulsion before drying.

17. An improved method according to claim 12 wherein the emulsion is spray dried.

18. An improved method according to claim 12 wherein the emulsion is drum dried.

19. An improved method according to claim 12 wherein the destabilizing agent is an acid.

20. An improved method according to claim 12 wherein the destabilizing agent is a higher polymeric carbohydrate which complexes in aqueous solution with the anionic emulsifier.

21. An improved method according to claim 12 wherein the destabilizing agent is a source of polyvalent cations which form insoluble, edible salts with the anionic emulsifier.

22. An improved method according to claim 21 wherein the destabilizing agent is milk.

23. An improved, dry whipped topping mix which comprises:
    a fat encapsulated in a carbohydrate, and including an amount of an emulsifier system which is effective to provide a stable emulsion, the emulsifier system comprising a minor amount of a strongly hydrophilic anionic emulsifier and a major amount of a nonionic emulsifier, the strongly hydrophilic anionic emulsifier and the nonionic emulsifier being present at a weight ratio of within the range of from about 1:15 to about 1:1; and an amount of a destabilizing agent effective to partially destabilize the emulsion.

24. An improved topping mix according to claim 23 wherein the emulsifier system is present in an amount of from about 2 to about 15 percent based upon the weight of the dry ingredients.

25. An improved topping mix according to claim 24 wherein the strongly hydrophilic, anionic emulsifier and the nonionic emulsifier are present at a weight ratio of within the range of from about 1:12 to about 1:2.

26. An improved topping mix according to claim 25 wherein the emulsifier system is present in an amount of from about 4 to about 13 percent based upon the weight of the dry ingredients.

27. An improved topping mix according to claim 26 wherein the fat and carbohydrate are present at a weight ratio of from about 1:7 to about 7:1.

28. An improved topping mix according to claim 23 wherein the destabilizing agent is an acid.

29. An improved topping mix according to claim 23 wherein the destabilizing agent is a high polymeric carbohydrate which complexes in aqueous solution with the anionic emulsifier.

30. An improved topping mix according to claim 23 wherein the destabilizing agent is a source of polyvalent cations which form insoluble, edible salts with the anionic emulsifier.

31. An improved topping mix according to claim 30 wherein the destabilizing agent is dry milk solids.

* * * * *

UNITED STATES PATENT AND TRADEMARK OFFICE
CERTIFICATE OF CORRECTION

PATENT NO. : 3,928,648
DATED : December 23, 1975
INVENTOR(S) : Howard D. Stahl, Rex J. Sims It is certified that error appears in the above-identified patent and that said Letters Patent are hereby corrected as shown below:

Title page, line 54, and Column 1, lines 2-3, "METHOD AND COMPOSITION FOR LOW pH WHIPPED TOPPINGS" should read --"WHIPPED TOPPINGS"--.

Column 1, line 13, "concurrently herewith" should read --June 14, 1974--

Signed and Sealed this

Sixth Day of December 1977

[SEAL]

Attest:

RUTH C. MASON
Attesting Officer

LUTRELLE F. PARKER
Acting Commissioner of Patents and Trademarks